US010519885B2

(12) United States Patent
Matsuzawa (10) Patent No.: US 10,519,885 B2
(45) Date of Patent: Dec. 31, 2019

(54) CONTROL APPARATUS FOR ENGINE

(71) Applicant: KABUSHIKI KAISHA TOYOTA JIDOSHOKKI, Kariya-shi, Aichi-ken (JP)

(72) Inventor: Yuya Matsuzawa, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 4 days.

(21) Appl. No.: 16/028,844

(22) Filed: Jul. 6, 2018

(65) Prior Publication Data

US 2019/0010886 A1 Jan. 10, 2019

(30) Foreign Application Priority Data

Jul. 7, 2017 (JP) .................. 2017-133599

(51) Int. Cl.
*F02D 41/14* (2006.01)
*F02D 41/30* (2006.01)

(52) U.S. Cl.
CPC ..... *F02D 41/1462* (2013.01); *F02D 41/1467* (2013.01); *F02D 41/3005* (2013.01); *F02D 2200/08* (2013.01); *F02D 2200/101* (2013.01)

(58) Field of Classification Search
CPC ............ F02D 41/1462; F02D 41/3005; F02D 41/1467; F02D 41/0047; F02D 41/1445; F02D 29/06; F02D 2200/08; F02D 2200/101; F02D 2250/24; F02D 2041/1412; F02D 2041/026; F02M 26/05; F02M 26/06
See application file for complete search history.

(56) References Cited

U.S. PATENT DOCUMENTS

| 7,991,539 B2 * | 8/2011 | Enomoto | F02B 37/10 123/488 |
| 8,032,291 B2 * | 10/2011 | Surnilla | F02D 41/18 123/198 D |
| 2015/0219029 A1 * | 8/2015 | Nakashima | F02D 41/0072 123/703 |
| 2017/0167350 A1 * | 6/2017 | Han | F02D 41/1462 |
| 2018/0283293 A1 * | 10/2018 | Schwulst | G01M 15/048 |

FOREIGN PATENT DOCUMENTS

JP 2013-050083 A 3/2013

* cited by examiner

*Primary Examiner* — George C Jin
(74) *Attorney, Agent, or Firm* — Sughrue Mion, PLLC

(57) ABSTRACT

A control apparatus for an engine includes a rotation detector, a fuel injection device, and an output controller. The output controller calculates an emission amount of the pollutant and calculates an accumulated emission amount of a pollutant for a period of time. The output controller calculates a maximum allowable emission amount of the pollutant for a period of time. The output controller calculates a difference between the accumulated emission amount of pollutant and the maximum allowable emission amount of the pollutant. The output controller calculates a first output index by dividing the difference by the period of time. The output controller sets the allowable range for the output of the engine so that the emission amount of pollutant becomes equal to or less than the first output index.

5 Claims, 5 Drawing Sheets

CONTROL APPARATUS FOR ENGINE

BACKGROUND ART

The present disclosure relates to a control apparatus that controls an engine.

In a diesel engine adapted for use in a vehicle and an industrial machine, a so-called output restriction control is employed so as to comply with an emission control standard that regulates the density or the amount of pollutants in exhaust gas. In such output restriction control, the output of the engine is restricted to a degree that is lower than its maximum performance determined by the configuration of the hardware of the engine.

Japanese Patent Application Publication No. 2013-50083 discloses an engine control apparatus that restricts the output of the engine when the operation of an exhaust gas after treatment device is stopped.

If the output of the engine is uniformly restricted so as to meet the emission control standard at any driving condition in the output restriction control for the engine, the performance of the engine may be unnecessarily restricted, which prevents the engine from responding to a momentary output increase demand such as rapid acceleration.

The present disclosure is directed to providing a control apparatus for an engine that permits complying with the emission control standard while preventing the engine performance from being restricted unnecessarily.

SUMMARY

In accordance with an aspect of the present disclosure, there is provided a control apparatus for an engine including a rotation detector measuring an engine speed, a fuel injection device supplying a fuel into a combustion chamber of the engine based on a command value for a fuel injection amount, an output controller setting an allowable range for an output of the engine and controlling the output of the engine within the allowable range. The output controller calculates an emission amount of pollutant from the command value for the fuel injection amount for the fuel supply device and the engine speed measured by the rotation sensor. The output controller calculates an accumulated emission amount of a pollutant emitted from the engine for a period of time from a first point of time to a current point of time. The output controller calculates a maximum allowable emission amount of pollutant for a period of time from the first point of time to a second point of time at which a predetermined period of time has elapsed from the first point of time. The output controller calculates a difference between the calculated accumulated emission amount of pollutant and the calculated maximum allowable emission amount of the pollutant. The output controller calculates a first output index by dividing the calculated difference by the period of time from the current point of time to the second point of time. The output controller sets the allowable range for the output of the engine so that the emission amount of pollutant becomes equal to or less than the first output index.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof may best be understood by reference to the following description of the embodiments together with the accompanying drawings in which.

DETAILED DESCRIPTION OF THE EMBODIMENTS

The following will describe an embodiment of the present disclosure with reference to the accompanying drawings. It is to be noted that like or same parts or elements among the embodiment and its modifications are designated by the same reference numerals and the description thereof will not be reiterated.

Figure 1:
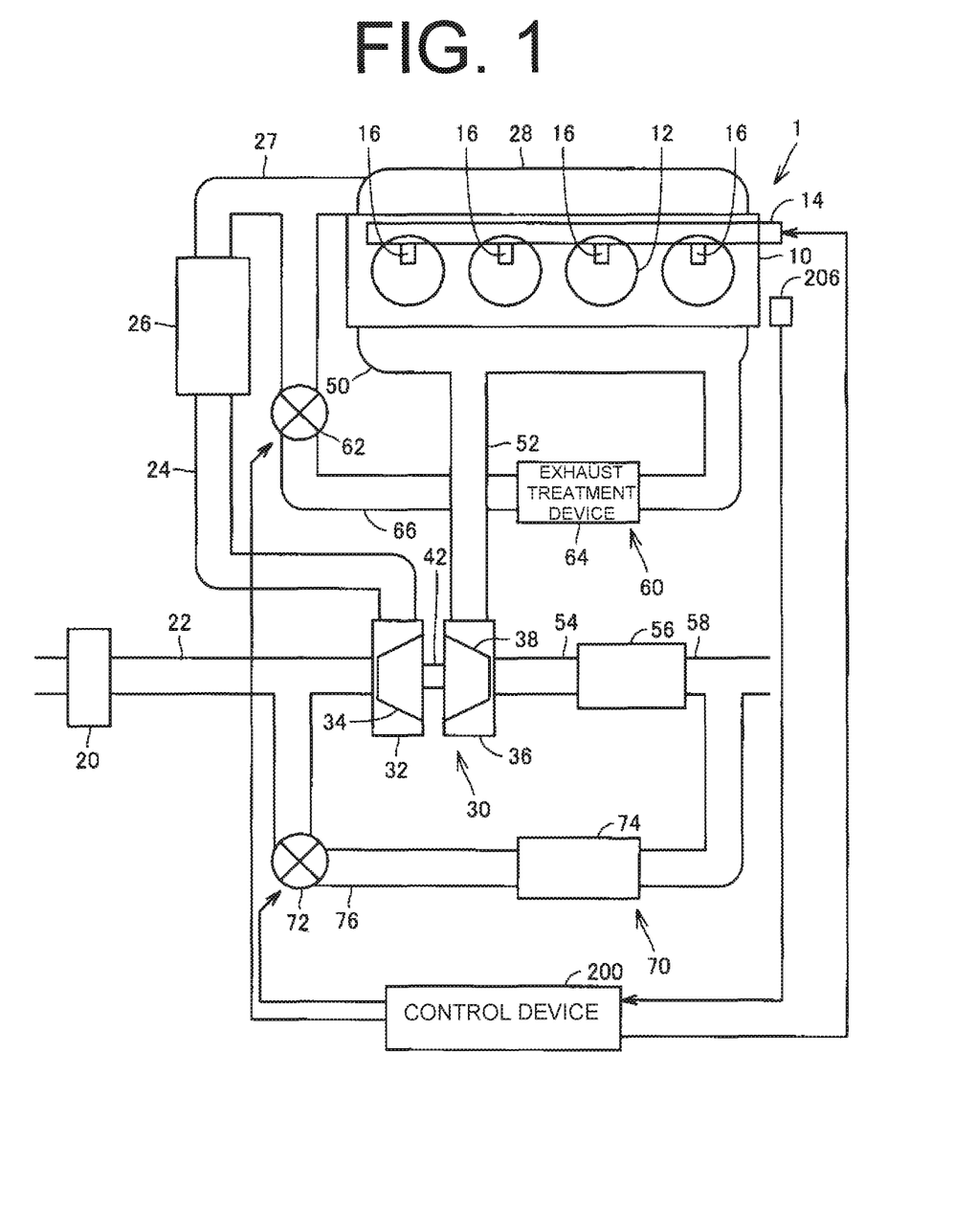
FIG. 1 is a schematic view of an engine having a control apparatus according to an embodiment of the present disclosure.

FIG. 1 depicts an engine 1 having an exhaust gas treatment apparatus according to an embodiment of the present disclosure. In the present embodiment, a common rail type diesel engine will be described as an example of the engine 1. However, the engine 1 may be provided by any other type of engine such as a gasoline engine.

The engine 1 includes an engine body 10, an air cleaner 20, an intercooler 26, an intake manifold 28, a supercharger 30, an exhaust manifold 50, an exhaust gas treatment device 56, a first exhaust gas recirculation device 60 (hereinafter referred to as the first EGR device 60), a second exhaust gas recirculation device 70 (hereinafter referred to as the second EGR device 70), a control device 200, and an engine speed sensor 206. The engine speed sensor 206 corresponds to the rotation detector of the present disclosure.

The engine body 10 includes a plurality of cylinders 12, a common rail 14, and a plurality of fuel injectors 16. In the present embodiment, the engine 1 is shown having an inline four cylinder configuration, but the engine 1 may have other cylinder configurations such as a V engine and a flat engine.

Each fuel injector 16 is provided for its cylinder 12 and connected to the common rail 14. The fuel injector 16 corresponds to the fuel injection device that supplies a fuel into a combustion chamber of the engine 1 based on a command value for the fuel injection amount. Fuel stored in the fuel tank 214 flows through the fuel filter 212, is pressurized by the fuel pump 210 to a predetermined pressure and supplied to the common rail 14. The fuel in the common rail 14 is injected by each fuel injector 16 at a predetermined timing. The fuel injectors 16 are operable based on control signals from the control device 200.

The air cleaner 20 removes particulates from air introduced from the outside of the engine 1. The air cleaner 20 is connected to one end of a first intake pipe 22.

The other end of the first intake pipe 22 is connected to an inlet of a compressor 32 of the supercharger 30. An outlet of the compressor 32 of the supercharger 30 is connected to one end of a second intake pipe 24. The compressor 32 pressurizes air flowing thereinto from the first intake pipe 22 and supplies pressurized air to the second intake pipe 24. The operation of the compressor 32 will be described in detail later.

The other end of the second intake pipe 24 is connected to one end of the intercooler 26. The intercooler 26 is a heat exchanger of an air cooling type or a water cooling type that cools the air flowing through the second intake pipe 24.

A third intake pipe 27 is connected at one end thereof to the other end of the intercooler 26. The other end of the third intake pipe 27 is connected to the intake manifold 28. The intake manifold 28 is connected to an intake port of each cylinder 12 of the engine body 10. An intake throttle valve may be provided at a position upstream of the intake manifold 28 to allow exhaust gas flowing from the exhaust manifold 50 to recirculate through the first EGR device 60. In the following description, such recirculated exhaust gas into the intake passage will be referred to as the EGR gas.

The exhaust manifold 50 is connected to an outlet port of each cylinder 12 of the engine body 10. A first exhaust pipe 52 is connected at one end thereof to exhaust manifold 50. The other end of the first exhaust pipe 52 is connected to a turbine 36 of the supercharger 30. Thus, exhaust gas discharged from the outlet ports of the cylinders 12 is gathered in the exhaust manifold 50 and supplied to the turbine 36 through the first exhaust pipe 52.

A second exhaust pipe 54 is connected at one end thereof to the turbine 36. The other end of the second exhaust pipe 54 is connected to an inlet of an exhaust gas treatment device 56. The exhaust gas treatment device 56 includes an oxidation catalyst (not shown), e.g., diesel oxidation catalyst (DOC), that oxidizes nitrogen oxides (NOx) and carbon oxides (COx) in exhaust gas and a PM filter (not shown) that collects particulate matter (PM) in exhaust gas.

A third exhaust pipe 58 is connected at one end thereof to the outlet of the exhaust gas treatment device 56. Thus, the exhaust gas treatment device 56 is disposed in the exhaust gas passage of the engine 1. The other end of the third exhaust pipe 58 is connected to an additional exhaust gas treatment apparatus (e.g. catalyst) for removal of particular component from exhaust gas and a muffler. Thus, exhaust gas emitted from the turbine 36 flows through the second exhaust pipe 54, the exhaust gas treatment device 56, the third exhaust pipe 58, the catalysts, and the muffler and is discharged from vehicle.

The third intake pipe 27 and the exhaust manifold 50 are connected through the first EGR device 60 without passing through the engine body 10. The first EGR device 60 includes a first EGR valve 62, a first EGR cooler 64 and a first EGR passage 66. The first EGR passage 66 connects the third intake pipe 27 with the exhaust manifold 50. The first EGR valve 62 and the first EGR cooler 64 are disposed in the first EGR passage 66.

The first EGR valve 62 is operable in response to a control signal from the control device 200 and controls the flow rate of EGR gas passing through the first EGR passage 66. The first EGR cooler 64 is a heat exchanger of an air cooling type or a water cooling type that cools the air flowing through the first EGR passage 66. Combustion temperature in the cylinder 12 is reduced by allowing exhaust gas in the exhaust manifold 50 to be introduced to the intake of the engine 1 as the EGR gas through the first EGR device 60, which permits reducing formation of NOx.

The first intake pipe 22 and the third exhaust pipe 58 are connected through the second EGR device 70 without passing through the engine body 10. The second EGR device 70 includes a second EGR valve 72, a second EGR cooler 74, and a second EGR passage 76. The second EGR passage 76 connects the first intake pipe 22 with the third exhaust pipe 58. The second EGR valve 72 and the second EGR cooler 74 are disposed in the second EGR passage 76.

The second EGR valve 72 is operable in response to a control signal from the control device 200 and controls the flow rate of EGR gas passing through the second EGR passage 76. The second EGR cooler 74 is a heat exchanger of an air cooling type or a water cooling type that cools air flowing through the second EGR passage 76. Combustion temperature in the cylinder 12 is reduced by allowing exhaust gas in the third exhaust pipe 58 to be introduced to the intake side of the engine 1 as the EGR gas flowing through the second EGR device 70, which permits reducing formation of NOx.

The supercharger 30 includes the compressor 32 and the turbine 36. The compressor 32 has a housing accommodating therein a compressor wheel 34, and the turbine 36 has a housing accommodating therein a turbine wheel 38. The compressor wheel 34 and the turbine wheel 38 are connected through a connection shaft 42 and integrally rotatable. Thus, the compressor wheel 34 is driven to rotate by the energy of exhaust gas applied to the turbine wheel 38.

The control device 200 controls the operation of the engine 1. The control device 200 includes a central processing unit (CPU) that performs various processes, a memory that includes a read only memory (ROM) storing therein programs and data and a random access memory (RAM) storing therein data of processing results of the CPU, and inlet and outlet ports through which information is transferred to and from various sensors and devices provided externally (none being shown). The sensors connected to the inlet port include the engine speed sensor 206. The devices, which are connected to the outlet port so as to be controlled, include the plurality of fuel injectors 16, the first EGR valve 62, and the second EGR valve 72.

The control device 200 controls various devices to achieve the desired driving conditions of the engine 1 based on signals from various sensors and devices and the maps and programs stored in the memory. It is noted that various controls need not necessarily be carried out by using software, but may be performed by using specifically designed hardware such as electronic circuit. In addition, the control device 200 has a built-in timer circuit (not shown) for the measurement of time.

The engine speed sensor 206 measures the rotation speed of the crank shaft of the engine 1 as the engine speed NE. The engine speed sensor 206 generates a signal that is indicative of the engine speed NE and sends such signal to the control device 200.

In the engine 1 used for a vehicle or an industrial machine, a so-called output restriction control is employed so as to comply with an emission control standard that regulates the density or the amount of pollutants in exhaust gas. In such output restriction control, the output of the engine 1 is restricted to a degree that is lower than its maximum performance limit of the engine 1 that is determined by the configuration of the hardware. Each country has its own set of emission control standards that sets the allowable limits for pollutants per distance or per operation hour.

If the output power of the engine 1 is uniformly restricted so as to meet the emission control standard at any operating condition so as to meet the emission control standard with safety margin, the performance of the engine is unnecessarily restricted, which prevents the engine 1 from responding to a momentary output increase demand such as rapid acceleration.

In the present embodiment, the control device 200 is configured to operate in the following manner. The control device 200 calculates an emission amount of pollutants from the command value for an amount of fuel that is supplied from the fuel injector 16 (herein after referred to as the fuel injection amount) and the engine speed measured by the engine speed sensor 206. The control device 200 calculates the value of accumulated emission amount of pollutants emitted from the engine 1 (emission amount) for the period of time from the first point of time to the current point of time. The first point of time represents a point of time that is set at a time that is earlier than the current point of time. The control device 200 calculates an allowable emission amount of pollutant for the period of time from the first point of time to a second point of time at which a predetermined period of time has elapsed from the first point of time. The control device 200 calculates the difference between the calculated accumulated emission amount and the calculated allowable emission amount of the pollutant. The control device 200 calculates the output index by dividing the calculated difference by the period of time from the current point of time to the second point of time. The control device 200 set the allowable range for the output of the engine 1 from the current point of time on so that the pollutants emission amount does not exceed the output index. The control device 200 corresponds to the output controller of the present disclosure. The engine speed sensor 206, the fuel injector 16, and the control device 200 correspond to the control apparatus for the engine of the present disclosure.

Such configuration permits complying with the emission control standard while preventing the engine performance from being restricted unnecessarily. In the following description, nitrogen oxides (NOx) will be dealt as an example of pollutant, the emission amount of which is to be calculated.

Figure 2:
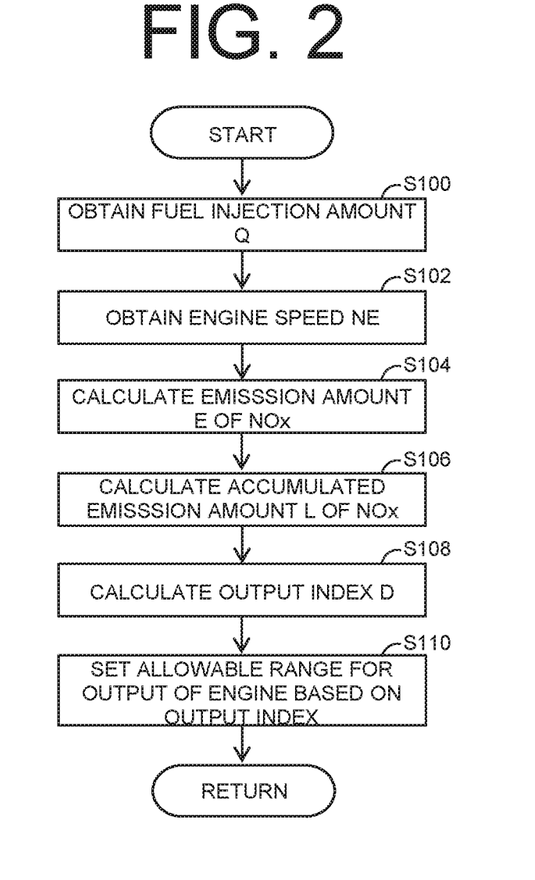
FIG. 2 is a flow chart showing a control process performed by a control device of the control apparatus of FIG. 1.

The following will describe a control process carried out by the control device 200 of the present embodiment with reference to the flow chart shown in FIG. 2. The control device 200 performs the control process of FIG. 2 at a predetermined time interval A.

At Step S100, the control device 200 obtains the fuel injection amount Q. For example, the control device 200 obtains the fuel injection amount Q based on the command value for the fuel injection amount (e.g., injection period).

At Step S102, the control device 200 obtains the engine speed NE. The control device 200 obtains the engine speed NE based on the measurement result of the engine speed sensor 206.

At Step 104, the control device 200 calculates the emission amount E of NOx. The control device 200 calculates the emission amount E of NOx based on the obtained fuel injection amount Q, the obtained engine speed NE and a predetermined map. The predetermined map has data of values of the emission amount of NOx for each of a plurality of operating conditions that include fuel injection amount and engine speed.

Figure 3:
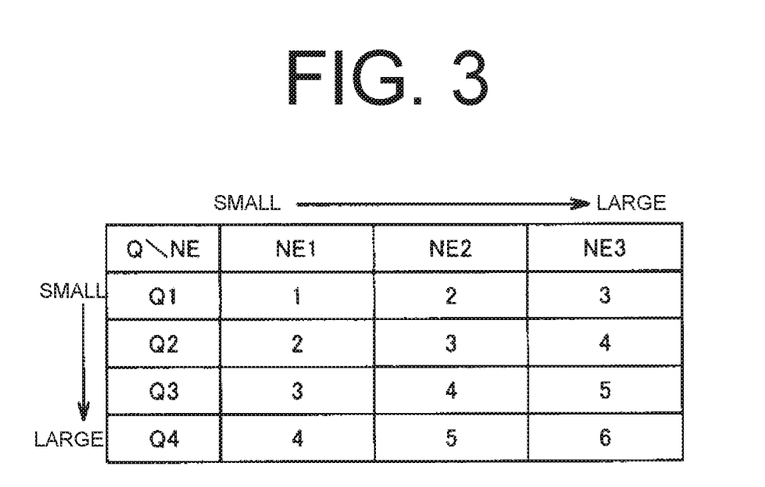
FIG. 3 is a map shown in the form of a table and describing a relationship among fuel injection amount, engine speed, and emission amount of NOx.

FIG. 3 shows an example of the map, which is shown in the form of a table, indicating the relationship among the fuel injection amount, the engine speed and the emission amount of NOx per unit time. Referring to FIG. 3, the values of the emission amount E of NOx are set for the respective combinations of the engine speed NE1, NE2, NE3 and the fuel injection amounts Q1, Q2, Q3, and Q4. The values of the emission amount E of NOx are determined based on experimental results.

It is noted that the value of the engine speed NE1 is less than NE2, and NE2 is less than NE3 and the values of the fuel injection amount Q1 is less than Q2, Q2 is less than Q3, and Q3 is less than Q4. In FIG. 3, the values 1 through 6 represent the emission amount E of NOx for the different combinations of the engine speed NE1 through NE3 with the fuel injection amount Q1 through Q4. The combinations of the engine speeds and the fuel injection amounts correspond to the operating conditions of the present disclosure. The values 1 through 6 are examples indicating that the emission amount E of NOx tends to increase as the operating conditions increase, that is, the higher rotation speed is, the greater the fuel injection amount is.

When the obtained engine speed NE is an intermediate value, for example, between the NE1 and NE2 or when the fuel injection amount Q is an intermediate value, for example, between the Q1 and Q2, the control device 200 calculates the emission amount E of NOx by way of linear interpolation.

Referring to FIG. 2, at Step S106, the control device 200 calculates an accumulated emission amount L of NOx, which corresponds to the value of the emission amount E of NOx that is accumulated during the period of time from the first point of time to the current point of time. The first point of time is a point of time that is set at a point prior to the current point of time. The control device 200 resets the value of the accumulated emission amount L of NOx to the initial value (zero) each time the predetermined period of time passes. The point of time at which the value of the accumulated emission amount L of NOx is reset corresponds to the first point of time. The control device 200 repeats a process of calculating the accumulated emission amount L of NOx by adding the emission amount E of NOx calculated at Step S102 to the previous value (the initial value) during a period of time from the first point of time to the point in time at which the predetermined period of time passes.

At Step S108, the control device 200 calculates an output index D. The control device 200 calculates a maximum allowable emission amount Lmax of NOx for a period of time from the first point of time to a second of time at which a predetermined period of time has elapsed from the first point of time. The control device 200 calculates a difference between the maximum allowable emission amount Lmax of NOx and the accumulated emission amount L of NOx by subtracting the value of the accumulated emission amount L of NOx at the present point from the value of the maximum allowable emission amount Lmax. The control device calculates a value obtained by dividing the difference between the maximum allowable emission amount Lmax of NOx and the accumulated emission amount L of NOx by the period of time from the first point of time to the second point of time as the output index D. The output index D corresponds to the first output index of the present disclosure.

At Step S110, the control device 200 sets the allowable range for the output of the engine 1 based on the calculated output index D. More specifically, the control device 200 sets the allowable range for the output of the engine 1 so that the emission amount E of NOx becomes equal to or less than the calculated output index D. The control device 200 controls the output of the engine 1 within the allowable range. In the present embodiment, the control device 200 sets allowable range for the operating conditions so that the emission amount E of NOx becomes equal to or less than the calculated output index D. The operating conditions include the fuel injection amount and the engine speed.

For example, the control device 200 sets the allowable range for the operating conditions so that the emission amount E of NOx for the predetermined period of time is equal to or less than the emission amount of NOx for the predetermined period of time calculated based on the output index D.

The allowable range for the operating conditions are preset based on the results of experiment made with the assumption that the value of accumulated emission amount L of NOx increases according to the slope indicated by the output index D. The control device 200 sets the operating conditions corresponding to the output index D as the upper limit (maximum control value) of the allowable range for the operating conditions.

In addition, the control device 200 changes the maximum control value for the operating conditions depending on the output index D. For example, if the output index D is greater than a threshold value, the control device 200 increases the maximum control value for at least one of the fuel injection amount and the engine speed a value that is greater than the maximum control value when the output index D is less than the threshold value.

In the present embodiment, when the output index D is greater than the threshold value, the control device 200 increases the maximum control value for the fuel injection amount to a level that is higher than when the output index is smaller than the threshold value, thereby to increase the torque to be generated by the engine 1.

Figure 4:
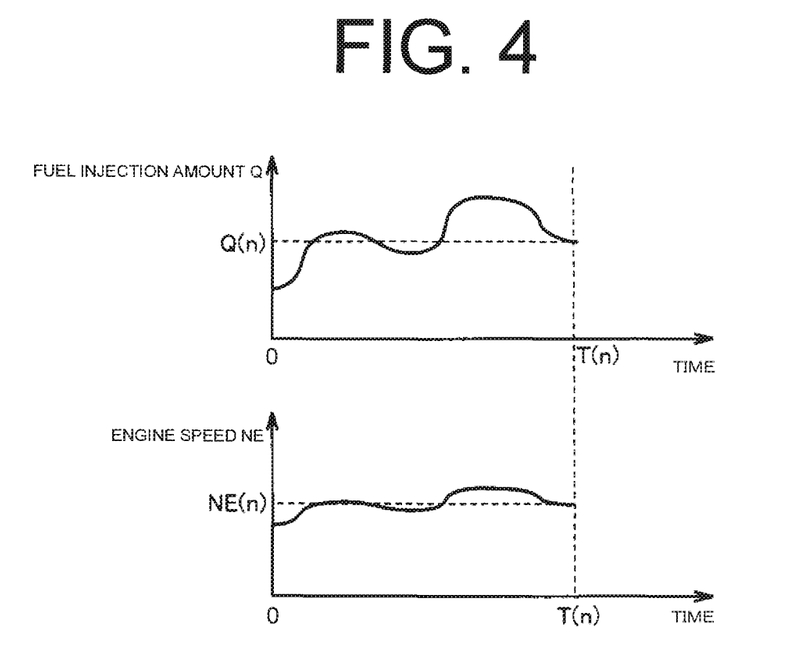
FIG. 4 shows time charts illustrating changes in the fuel injection amount and the engine speed with time, respectively.
Figure 5:
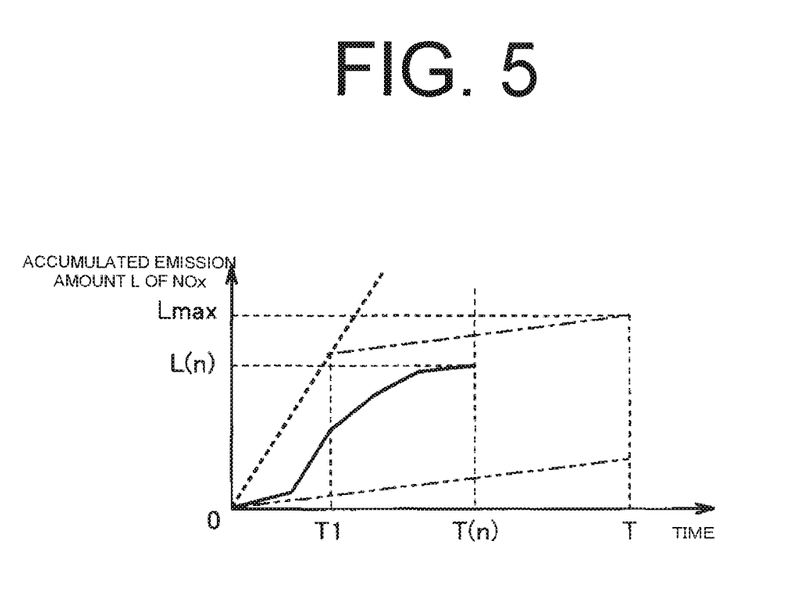
FIG. 5 is a time chart showing an example of a change in the accumulated emission amount of NOx with time.
Figure 6A:
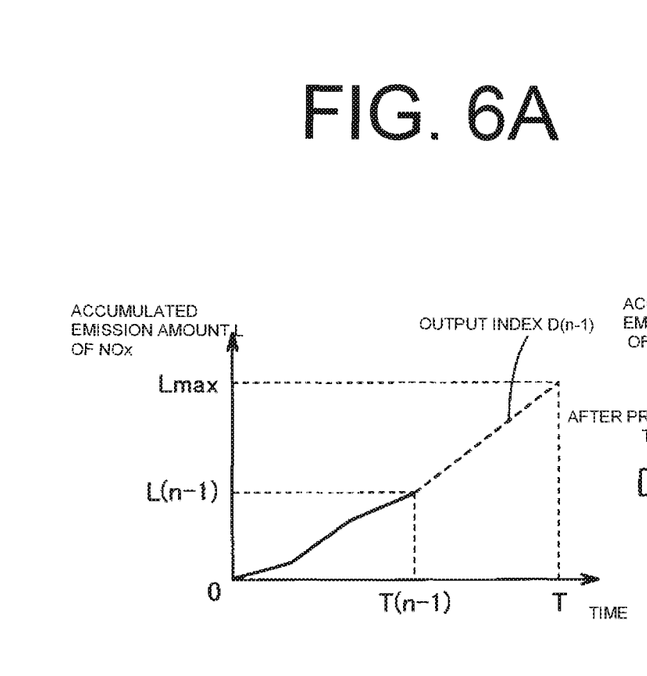
FIGS. 6A and 6B show charts for describing calculation of output indexes.
Figure 6B:
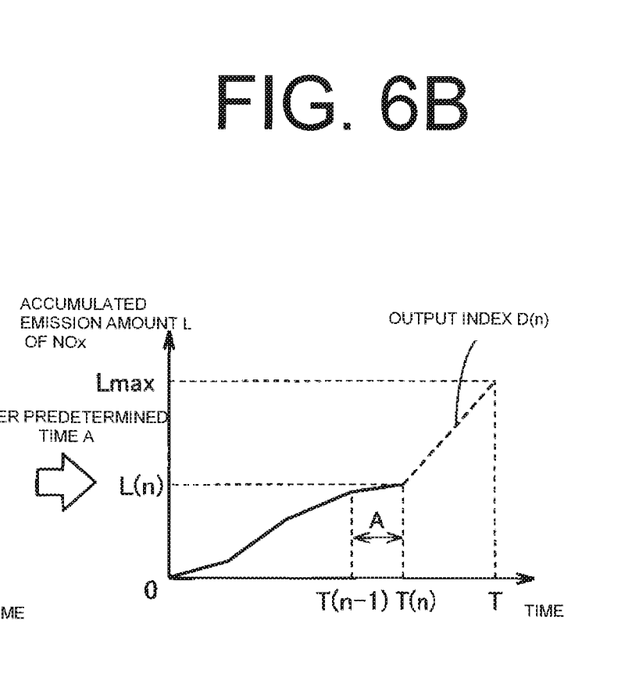

The following will describe the operation of the control device 200 having the above-described configuration according to the flow chart shown in FIG. 2 with reference to FIGS. 4 through 6.

FIG. 4 shows time charts showing changes in the fuel injection amount and the engine speed with time, respectively. The upper chart in FIG. 4 shows the change in the fuel injection amount in which the vertical and horizontal axes of the chart indicate the fuel injection amount Q and the time, respectively. The lower chart in FIG. 4 shows the change in the engine speed NE in which the vertical and horizontal axes of the chart indicate the engine speed NE and the time, respectively. In FIG. 4, 0 (time zero) and T(n) correspond to the first point of time and the current point of time, respectively.

During the operation of the engine 1, the control device 200 obtains the fuel injection amount Q (Step S100) and the engine speed NE (Step S102). Referring to FIG. 4, the control device 200 obtains the current fuel injection amount Q(n) and the current engine speed NE(n) at the current point of time.

As shown in FIG. 4, the control device 200 calculate the current emission amount E(n) of NOx based on the obtained current fuel injection amount Q(n), the current engine speed NE(n), and the map shown in FIG. 3 (S104). The control device 200 calculates the current accumulated emission amount L(n) of NOx by adding the calculated emission amount E(n) of NOx to the previous accumulated emission amount L(n−1) of NOx (Step S106).

The process of calculating the current value of the accumulated emission amount L(n) will now be described with reference to FIG. 5. FIG. 5 is a time chart showing a change in the accumulated emission amount L of NOx with time during the operation of the engine 1. The vertical and horizontal axes of the chart represent the accumulated emission amount L of NOx and the time, respectively. T(n) and time zero correspond to the current point of time and the first point of time, respectively. T corresponds to the second point of time at which the predetermined period of time has elapsed from the first point of time.

When the fuel injection amount Q and the engine speed NE change in a manner shown in FIG. 4 during the period from the first point of time (time zero) to the current point of time (T(n)), the value of the emission amount E of NOx, which is calculated each time the predetermined time A passes, is added to the value of the accumulated emission amount L of NOx, so that the accumulated emission amount L of NOx is increased monotonously as indicated by the solid line in FIG. 5. At the current point of time T(n), the control device 200 calculates the emission amount E(n) of NOx based on the fuel injection amount Q(n) and the engine speed NE(n) and then calculates the current value of the accumulated emission amount L(n) of NOx by adding the calculated value of the emission amount E(n) of NOx to the previous value of the accumulated emission amount L(n−1) of NOx.

The thick dashed line in FIG. 5 indicates a change in the accumulated emission amount L of NOx when the engine 1 is operated from the time zero under a condition that the emission amount of NOx becomes maximum (maximum emission condition). The single-dashed chain line in FIG. 5 shows a change in the accumulated emission amount L of NOx when the operation of the engine 1 is kept at the minimum operating condition after the engine 1 is operated under the maximum emission condition up to T1. The double-dashed chain line in FIG. 5 shows a change in the accumulated emission amount L of NOx when the operating condition of the engine 1 is kept at the minimum operating condition from the time zero.

Since the operation of the engine 1 changes between the maximum emission condition and the minimum operating condition, the accumulated emission amount L of NOx changes within a range that is higher than the double-dashed chain line and lower than the single-dashed chain as well as the dashed lines in FIG. 5.

The output index D is calculated based on the value of the current accumulated emission amount L(n) of NOx (S108). The following will describe a process for calculating the output index D with reference to FIGS. 6A and 6B.

FIGS. 6A and 6B are charts describing the calculation of the output index D. FIG. 6A indicates a change in the accumulated emission amount L of NOx up to the previous calculation timing T(n−1). FIG. 6B indicates a change in the accumulated emission amount L of NOx up to the current calculation timing T(n). The vertical and horizontal axes of the charts in FIGS. 6A and 6B indicate the accumulated emission amount L of NOx and the time, respectively.

Referring to FIG. 6A, if the current point of time is at the point T(n−1), the slope, which is calculated by dividing the difference (Lmax−L(n−1)) between the maximum allowable emission amount Lmax and the accumulated emission amount L(n−1) of NOx at the point of time T(n−1) by the period of time (T−T(n−1)), is calculated as the output index D(n−1).

Referring to FIG. 6B, if the current point of time is at the point T(n) that is the point at which the predetermined time A has elapsed from the point of time T(n−1), the slope, which is calculated by dividing the difference (Lmax−L(n)) between the maximum allowable emission amount Lmax and the accumulated emission amount L(n) of NOx at the point of time T(n) by the period of time (T−T(n)), is calculated as the output index D(n).

If the change in the accumulated emission amount L of NOx (the slope) during the period of time from the point T(n−1) to the point T(n) is less than the output index D(n−1), the thick dashed line in FIG. 6B during the same period of time inclines more steeply than the output index D(n−1), thus the output index D being increased.

The allowable range for the output of the engine 1 is set based on the calculated output index D (S110). The following will describe a control process for setting the allowable range for the output of the engine 1 with reference to FIG. 7.

Figure 7:
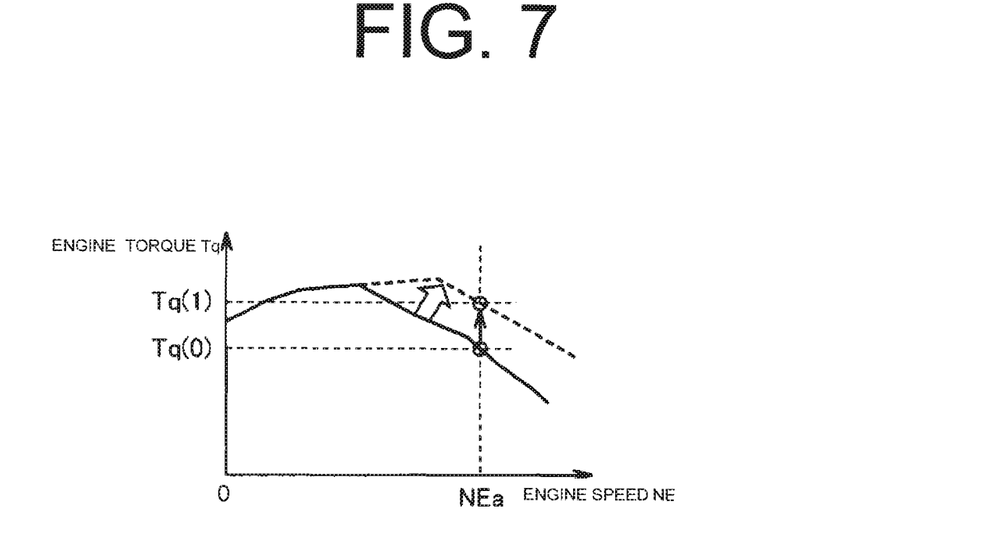
FIG. 7 is a chart showing a change in the upper limit of engine torque.

FIG. 7 is a chart showing the relationship between the engine torque and the engine speed. In FIG. 7, the vertical and horizontal axes of the chart represent the engine torque Tq and the engine speed NE, respectively. The solid line in FIG. 7 indicates the upper limit of the engine torque Tq relative to the engine speed NE when the output index D is less than the threshold value. The dashed line in FIG. 7 indicates the upper limit of the engine torque Tq relative to the engine speed NE when the output index D is equal to or greater than the threshold value.

The control device 200 determines the fuel injection amount, for example, based on the output demand according to the accelerator opening. If the output index D is less than the threshold value, the control device 200 determines the fuel injection amount with a first value set as the maximum control value. If the output index D is equal to or greater than the threshold value, the control device 200 determines the fuel injection amount with a second value, which is greater than the first value, set as the maximum control value. Because the maximum control value is changed in two levels according to the results of comparison between the output index D and the threshold value, the upper limit of the engine torque Tq is also changed in two levels according to the results of comparison between the output index D and the threshold value, as shown by the solid and dashed lines in FIG. 7.

Referring to FIG. 7, in the case in which the engine speed NE remains constant at NEa before and after the change of the output index D, for example, the fuel injection mount is determined with the first value set as the maximum control value when the output index D is less than the threshold value. In this case, the upper limit of the engine torque Tq is set at Tq(0).

When the output index D is equal to or greater than the threshold value, on the other hand, the fuel injection amount is determined with the second value set as the maximum control value. In this case, the upper limit of the engine torque Tq is set at Tq(1), which is greater than the Tq(0).

The output of the engine 1 is controlled so that the value of the accumulated emission amount L of NOx for the predetermined period of time from the first point of time (time zero) to the second point of time does not exceed the value of the maximum allowable emission amount Lmax. This permits the engine 1 to meet the NOx emission control standards.

In this way, the engine control apparatus of the present embodiment sets the allowable range for the output of the engine 1 so that the NOx emission amount does not exceed the output index D. Accordingly, the present disclosure provides an engine control apparatus that permits an engine to meet the emission control standard while preventing restriction of the performance of the engine 1 unnecessarily.

The following will describe a modified embodiment of the present disclosure. Although the foregoing description has dealt with the NOx as an example of pollutants, the pollutant is not limited to NOx. For example, particulate matter may be used for the calculation of the allowable output range.

In the above-describe embodiment, the control upper limit for the fuel injection amount is changed in the two levels depending on whether the output index D is equal to or greater than the threshold value, but a plurality of threshold values may be set for the output index D and the control upper limit may be changed in a plurality of levels. The control upper limit for the fuel injection amount may be changed linearly or non-linearly according to the change in the output index D.

In the above embodiment, it has been described that the value that is obtained by dividing the difference between the accumulated emission amount L of NOx from the first point of time to the current point of time and the maximum allowable emission amount Lmax by the period of time from the current point of time to the second point of time is calculated as the output index D. According to the present disclosure, however, the output index need not be limited to one. In addition to the above output index, another output index may be calculated as D2. Specifically, the output index D2 may be figured out by dividing the difference between the accumulated emission amount L of NOx from the third point of time, which is set at a point of time before the current point of time after the first point of time, to the fourth point of time, which is set at a point of time after the second point of time and at which the predetermined period of time has elapsed from the third point of time, and the maximum allowable emission amount by the period of time from the current point of time to the fourth point of time. In the case in which a plurality of output indexes such as D1, D2 is calculated at the current point of time, the control device 200 calculates the allowable range for the output of the engine 1 based on the smallest value of the plural indexes. The output index D1 and output index D2 correspond to the first output index and second output index, respectively.

Figure 8:
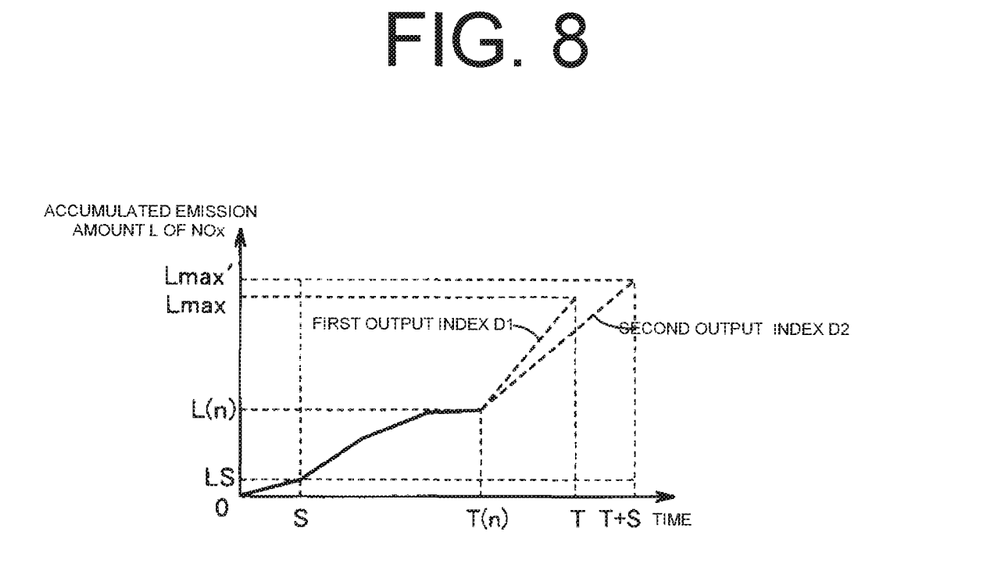
FIG. 8 is a time chart describing the operation of the control device according to a modified embodiment of the present disclosure.

FIG. 8 is a time chart describing the operation of the control device 200 according to the modified embodiment. The vertical and horizontal axes in FIG. 8 indicate the accumulated emission amount L of NOx and the time, respectively.

The following description will be made based on the assumption that the current point of time is at the point T(n) in FIG. 8. The first output index D1 corresponds to the value that is calculated for the period of time from the first point of time (time zero) to the second point of time at which the predetermined period of time has elapsed from the first point of time. Specifically, the first output index D1 is calculated by dividing the difference (Lmax−L(n)) between the maximum allowable emission amount Lmax and the accumulated emission amount L(n) of NOx by the period of time (T−T(n)).

The second output index D2 is calculated for the period of time from the third point of time corresponding to the point of time S to the fourth point of time at which the predetermined period of time has elapsed from the third point of time (T+S). Specifically, the second output index D2 is calculated by dividing the difference (Lmax'−L(n)) between the maximum allowable emission amount Lmax' of NOx and the accumulated emission amount L(n) of NOx by the period of time (T+S−T(n)). It is noted that LS in FIG. 8 indicates the accumulated emission amount L of NOx at the point of time S. The maximum allowable emission amount Lmax' corresponds to the allowable accumulated emission amount of NOx to which the value of the accumulated emission amount of NOx may be increased from the accumulated emission amount LS of NOx at the point of time S. The maximum allowable emission amount Lmax' corresponds to the sum of the accumulated emission amount LS of NOx and the maximum emission amount Lmax of NOx.

In the case in which two output indexes D1, D2 are calculated at the current point of time T(n) based on the two different periods of time, the allowable range for the output of the engine 1 is determined based on the smaller value, i.e., the second output index D2. This prevents the accumulated emission amount L of NOx from exceeding the maximum emission amount Lmax for the periods of time from the first point of time to the second point of time and from the third point of time to the fourth point of time while preventing the performance of the engine from being unnecessarily restricted.

The modified embodiment may be practiced with the combination of all or part of the above-described features. The above-described embodiments of the present disclosure are examples and not intended to limit the scope of the present invention. The scope of the present invention is to be construed not by the above description but by claims and intended to include any modification corresponding to the scope of the claims.

What is claimed is:

1. A control apparatus for an engine comprising:
a rotation detector measuring an engine speed;
a fuel supply device supplying a fuel into a combustion chamber of the engine based on a command value for a fuel injection amount; and
an output controller setting an allowable range for an output of the engine and controlling the output of the engine within the allowable range, wherein
the output controller calculates an emission amount of pollutant from the command value for the fuel injection amount for the fuel supply device and the engine speed measured by the rotation detector,
the output controller calculates an accumulated emission amount of the pollutant emitted from the engine for a period of time from a first point of time to a current point of time,
the output controller calculates a maximum allowable emission amount of the pollutant for a period of time from the first point of time to a second point of time at which a predetermined period of time has elapsed from the first point of time,
the output controller calculates a difference between the calculated accumulated emission amount of the pollutant and the calculated maximum allowable emission amount of the pollutant,
the output controller calculates a first output index by dividing the calculated difference by the period of time from the current point of time to the second point of time, and
the output controller sets the allowable range for the output of the engine so that the emission amount of the pollutant becomes equal to or less than the first output index.

2. The control apparatus for the engine according to claim 1, wherein the output controller calculates the emission amount of the pollutant based on the command value for the fuel injection amount, the engine speed and a predetermined map that has data of values of the emission amount for each of a plurality of operating conditions, wherein the operating conditions includes the fuel injection amount and the engine speed, and wherein the output controller sets an allowable range for the operating conditions so that the emission amount of the pollutants becomes equal to or less than the first output index.

3. The control apparatus for the engine according to claim 2, wherein the output controller changes a maximum control value for the operating conditions depending on the first output index, and wherein the output controller increases the maximum control value for at least one of the fuel injection amount and the engine speed when the first output index is greater than a threshold value.

4. The control apparatus for the engine according to claim 1, wherein the pollutant includes particulate matter and/or nitrogen oxides.

5. The control apparatus for the engine according to claim 1, wherein the output controller calculates a second output index by dividing the difference between the accumulated emission amount of the pollutant for a period of time from a third point of time that is before the current point of time and after the first point of time to the current point of time and the maximum allowable emission amount of the pollutant for a period of time from the third point of time to a fourth point of time at which the predetermined period of time has elapsed from the third point of time by the period of time from the current point of time to the fourth point of time, and wherein the output controller sets the allowable range for the output of the engine based on a smaller value of the first output index and the second output index.

* * * * *